Nov. 2, 1965 D. C. PEEK 3,215,817
HEATING DEVICES FOR UTENSILS
Filed May 22, 1963 6 Sheets-Sheet 2

INVENTOR.
Duncan C. Peek
BY

Nov. 2, 1965        D. C. PEEK        3,215,817
HEATING DEVICES FOR UTENSILS
Filed May 22, 1963        6 Sheets-Sheet 3

INVENTOR.
Duncan C. Peek
BY
A. J. Nydick
Atty

Nov. 2, 1965 D. C. PEEK 3,215,817
HEATING DEVICES FOR UTENSILS
Filed May 22, 1963 6 Sheets-Sheet 5

INVENTOR.
Duncan C. Peek
BY
A. J. Nydick
Atty

United States Patent Office 3,215,817
Patented Nov. 2, 1965

3,215,817
HEATING DEVICES FOR UTENSILS
Duncan C. Peek, 1689 Graham Road, Meadowbrook, Pa.
Filed May 22, 1963, Ser. No. 282,420
12 Claims. (Cl. 219—446)

This invention relates to electric ranges and related devices whereof the surface is utilized for heating purposes. More particularly, it is directed to improvements in such structures wherein the effective heating area is coordinated with the size of the utensil being heated.

Heretofore, electric stoves have utilized two or more different sizes of heating units, each unit working independently of the other. Ordinarily such an arrangement is adequate. However, when it is necessary to heat a utensil that is smaller or larger in surface area than the customary heating units, there is either a considerable waste of current due to the unnecessary heat or not enough current evenly or sufficiently to heat the surface of the utensil. Furthermore, in consequence of the present configuration and limitations, ranges of such shape have a limited number of heating temperatures that are predetermined and thus limit the use thereof to a set number of temperatures which are not always advantageous to the user. Moreover, the total usable area of the top surface of such a range is limited to the number of heating units provided. For example, if two elements are provided, only two utensils can be heated; if three elements are provided, only three utensils can be heated. Thus, the useful heating portion of the range top is only the area provided by the heating elements per se; and the remaining surface is wasted from the standpoint of providing heating area.

It is among the primary objects of this invention to provide a novel and improved heating device whereof only the portion of surface area of the whole unit is made operative so as to provide means for maximum efficiency in heating a utensil or object placed on the unit, regardless of the shape of the utensil or the object; and thus to provide a heating device where the whole of the surface area can be employed for heating purposes, combined with variable temperature control.

It will be understood that the achievement of the above mentioned primary objective resides in a structure having a configuration which is different from that of existing ranges; and as will appear from the subsequent more detailed description, other objects and advantages will become apparent. In its fundamental aspects, the primary objective of this invention is attained by a structure wherein the whole surface area is constituted of a plurality of individual spring-loaded, small-sized heating units, which in the aggregate, together form a pattern that will permit any size or shape of utensil (large or small, round, oval, rectangular or square) evenly and efficiently to be heated. Each of said heating units must be depressed in order to close an electric circuit which results in the heating of the unit, but, when a utensil is placed on such unit surface, the only heating units which will undergo depression are those immediately lying beneath the utensil. Thus, the undepressed heating units remain unactuated electrically.

Another important object of the invention is to provide a novel and improved electric heating device of the general kind above referred to which affords the advantage of greater safety in comparison with heating devices of this kind as heretofore known in that all non-used heating elements of the device are automatically de-energized thus reducing the danger of burning by contact with a heating element accidentally left connected.

The depressed heating units are tied into a common circuit that is controlled by means of a variable rheostat, variable transformer or a like control that regulates the flow of current or voltage into the heating units themselves.

A fuller understanding of this invention will be gathered from the following detailed description taken in connection with the accompanying drawings wherein:

FIG. 2 is an exploded perspective view of the circuit board assembly of the portable electric range according to FIG. 1 and exposing each of three distinct parts of this assembly.

FIG. 6 is a top plan view of the embodiment of this invention in the form of a table top range, and.

Figure 1:
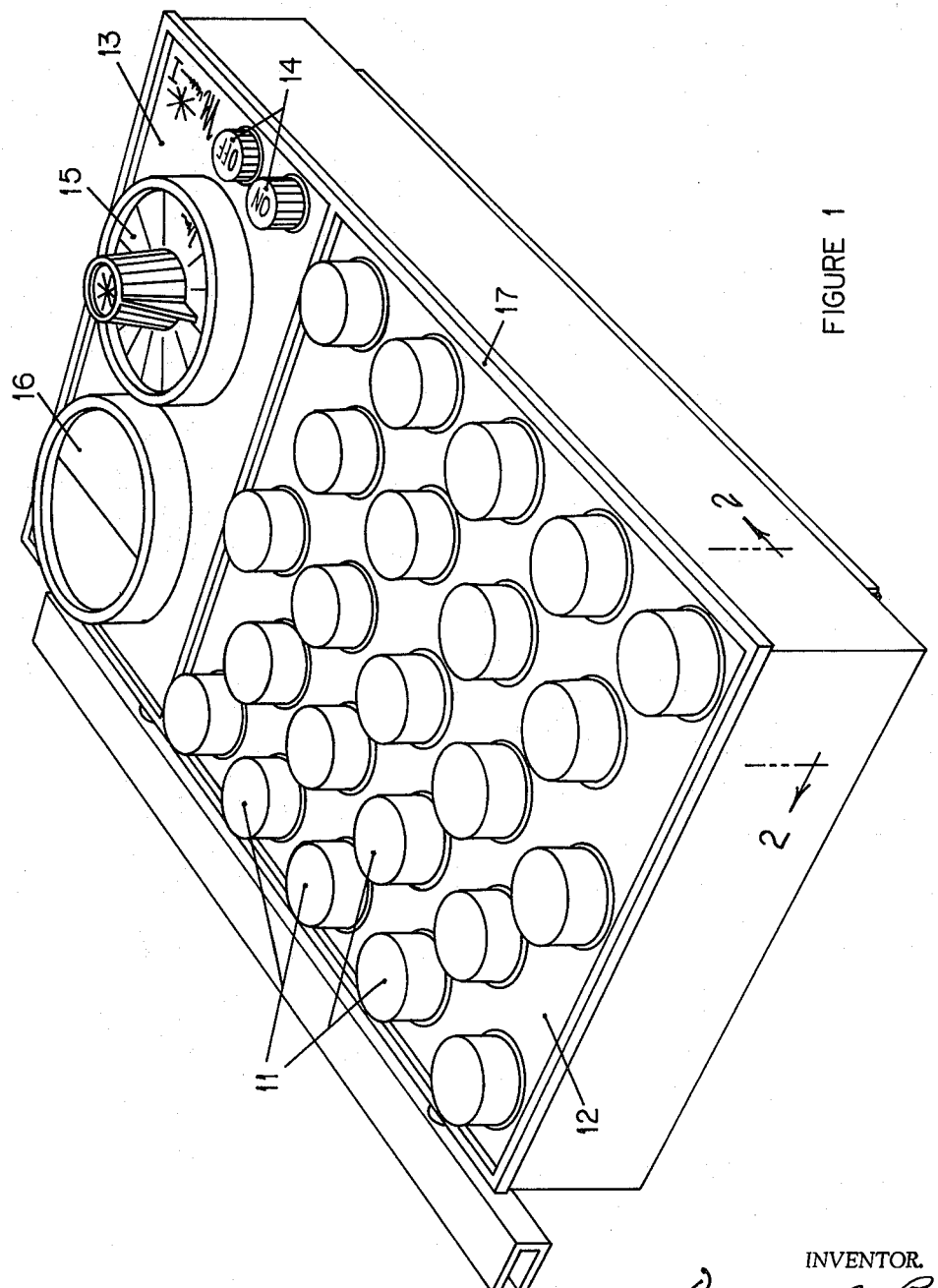
FIG. 1 is an exterior perspective view of an embodiment of this invention in the form of a portable electric range.

The present invention as shown in FIG. 1 comprises a plurality of individual heating element units 11. These heating units are spaced equidistant from each other to form a pattern that will allow any size or shape of utensil to be placed upon the range for the most efficient heat coverage. Each heating unit has a flat top surface for maximum heat transfer and enough space is provided between each heating unit for quick circulation and the fast dispersal of heat when the range is turned off, or not in use.

Surrounding these heating element units is a surface plate and guide 12 which also serves as spillage container. The surface plate can be removed and immersed into a solution, cleaned, and replaced without removing the element units.

Beside the surface plate but separated by a partition or frame 17 is the control panel 13 which is comprised of three units. The first unit being the master push button switch 14 that controls the outside flow of electric current into the range itself. This switch 14 is designed to provide the range with a circuit breaker as an added safety measure. The second unit being the variable transformer control 15 which provides for the flow of electricity into the printed circuit and later into the individual heating element units. This variable control will have a dial or surface plate that is graduated in degrees from the maximum heat potential to the minimum heat potential of the heating surface of the range. The third and final unit being the control light 16 that is wired through the variable control and increases in intensity as the heating element units increase in wattage output and decreases in intensity as the heating element units decrease in wattage output.

Figure 2:
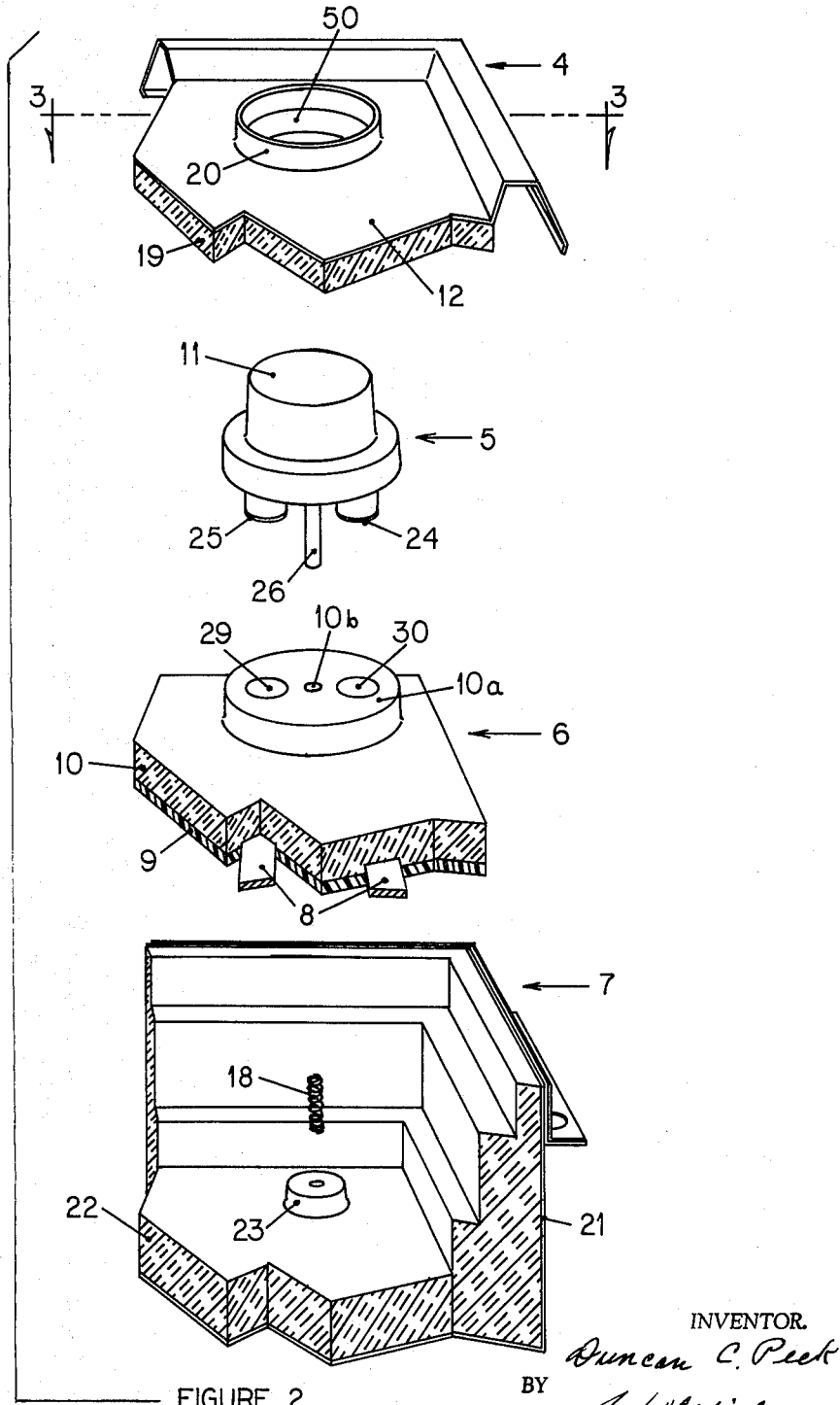
FIG. 2 is an exploded perspective view of a section of FIG. 1 taken on line 2—2 and exposing each of four major assemblies of the range.

In reference to FIG. 2 there are four major assemblies 4, 5, 6 and 7 plus a spring 18. The first of these assemblies is the surface plate assembly 4 being comprised of two parts, a surface plate 12 made of stainless steel and an insulation plate 19 made of "Maronite" or other suitable insulation. Both would have stamped holes 50 corresponding to the prescribed arrangement of heating element assemblies 5. As the holes are made in the surface plate 12 a die would press the remaining edge into a flange 20 slightly larger than the diameter of the heating element assembly 5 so that the surface plate 12 will serve also as a guide. An insulation plate 19 is bonded to the surface plate 12 to stabilize the plate and dissipate any heat pick-up.

Secondly, the container assembly 7, is comprised of an exterior shell 21 and an interior wall insulation 22. The exterior shell 21, made for instance of stainless steel, may be stamped from sheet stock and made to correspond to the variety of shapes or sizes that the range configuration may be in final production. The wall insulation 22 cast of "Maronite" or like insulation has step-down shelves each following prescribed dimensions corresponding to the assemblies 4 and 5 and having mound appendages 23 on the base platform corresponding to holes 50 in plate 12. The mound 23 is drilled to correspond with a plunger rod 26 and should be deep enough to serve as a guide for said plunger rod 26 and holder for the steel compression spring 18.

Figure 4:
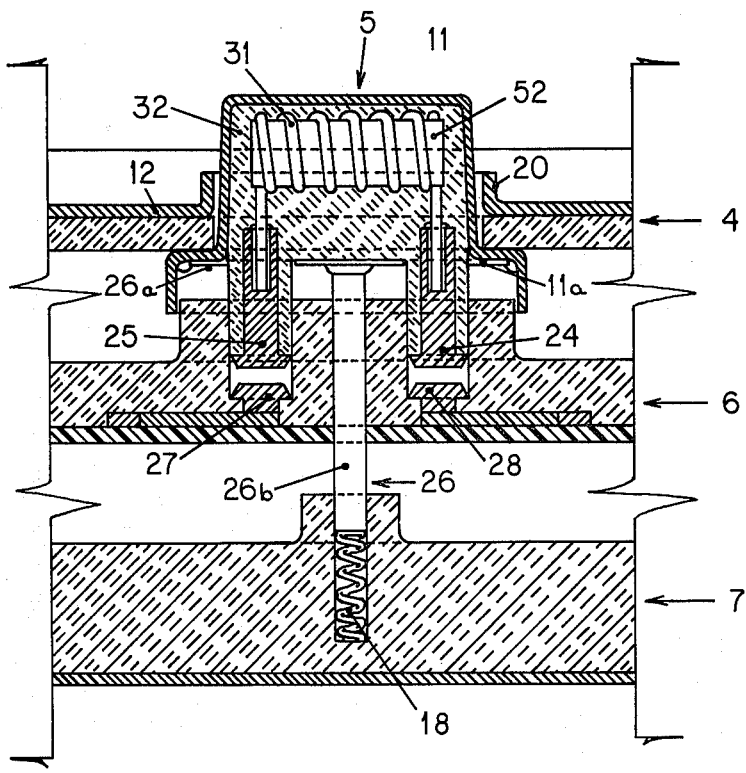
FIG. 4 is a cross-section view of the structure illustrated in FIG. 2 taken on line 3—3.

The third major assembly, the heating element assembly 5, comprises a heating element unit 11 contact points 24 and 25 and the plunger rod 26. This assembly will be explained in greater detail as the drawing in FIG. 4 is described.

The final assembly, the circuit board assembly 6 shown in FIG. 2 consists of two major parts. The first part being the printed circuit board comprised of the conductive wire circuit 8 and a plastic fiber card 9. The second part being a cast insulation sheet 10, such as a maronite sheet. The insulation sheet 10 is bonded by a suitable adhesive such as an epoxy cement to the printed circuit board so that the sheet covers the exposed portion of the conductive wire circuit to eliminate exposure to outside interference.

As shown in FIG. 2 there is a round built-up area 10a constructed to form a well between each heating element assembly 5 to collect any spillage that may occur during the cooking stage and to serve as a guide for the shell of the heating element unit 11. Three holes are formed in each built-up area of the circuit board assembly. One hole 10b is drilled exactly on center of this built-up area and through the entire assembly to form a guide for the plunger pole 26. The remaining two holes 29 and 30 are located equidistant from the center of the built-up area corresponding to the column like protrusions that protect and contain the contact points 24 and 25. These holes are provided to expose the contact points of the wire circuit 8.

The circuit board assembly is best explained by referring to FIG. 3 as this figure illustrates a complete segment of this assembly and represents the full complement of guides, holes, and contact points necessary to make operable the portable range as explained in connection with FIG. 1. The printed conductive circuit pattern 8 is bonded to insulation backing 9 such as plastic fiber board. The knobs or disk shapes of the printed circuit wire 8 represent the positive and negative contact points 27 and 28 of said printed circuit. In this case contact point 27 would be the negative pole and contact point 28 would be the positive pole. These two contact points 27 and 28 correspond to, and are exposed by, the holes 29 and 30 of the molded insulation sheet 10 and as follows, each pair of contact points of the printed circuit correspond with each remaining pair of holes shown in the insulation sheet 10. As described previously in conjunction with FIGS. 2 to 6 the conductive wire circuit 8, the plastic fiber board 9 and the insulation sheet 10 are bonded together to form the circuit board assembly in final production.

The heating element assembly as shown in FIG. 4 is made up of seven individual parts. The shell 11 is flat at its top so that the maximum surface heat can be attained. The shell has a flange 11a to act as a stop surface and to serve as a shield to prevent moisture or liquid from entering and shorting the contact areas. The heating element 31 is made of a highly resistant wire such as nichrome wire and is wrapped around a molded shape 52 made of a dielectric heat refractory material. The same dielectric material 32 is cast to hold the heating element 31 and the molded shape 52 into their prescribed position, away from the inside wall of the shell 11. This process may be done with the use of an armature or special clamp. Soldered to each end of the heating element 31 and surrounded by the dielectric material 32 are the contact points 24 and 25. These contact points may be made of copper and coated with platinum or silver for the best possible contact with the least amount of spark.

Spot-welded to the inside of the flange area of the shell 17 is the plunger rod 26 made from a round stainless steel disk 26a drilled with two holes corresponding to the contact points 24 and 25 and a length of stainless steel bar 26b welded to the center of this disk.

The operation of this range is very simple and is best described in conjunction with FIG. 4. It is to be noted that when all parts are assembled the heating element assembly 5 is held tightly against the surface plate assembly 4 by the compression spring 18. This compression spring is located far enough from the heating element 31 so that any heat traveling along the plunger bar 26b will not effect or cause fatigue of said spring 18. As shown in assemblies 4, 6, and 7 a large amount of insulation is used in this range to soak up any loss of heat and prevent damage to all parts of this range not directly involved in the actual heat transfer necessary for cooking or heating. The heating element assembly 5 (FIG. 4) is shown in its open position so that if the master switch is left open, the element 31 will not become energized and heat up. In order for this element to become energized it must be depressed and as in many cases the weight of the utensil itself is not enough to force the heating element to be depressed. Therefore, when a utensil, containing the substance to be cooked or heated is placed upon the range, the heating element assembly 5 is depressed and contacts are made through the contact points 25 and 27 and the contact points 24 and 28 causing the element 31 to become energized and heat to the desired temperature. After the cooking process has been completed and the utensil has been removed, the compression spring 18 will force the heating element assembly 5 back to its original position and break the contact points 25 and 27 and contact points 24 and 28 thus opening the circuit and causing the element to lose its heating potential.

Figure 3:
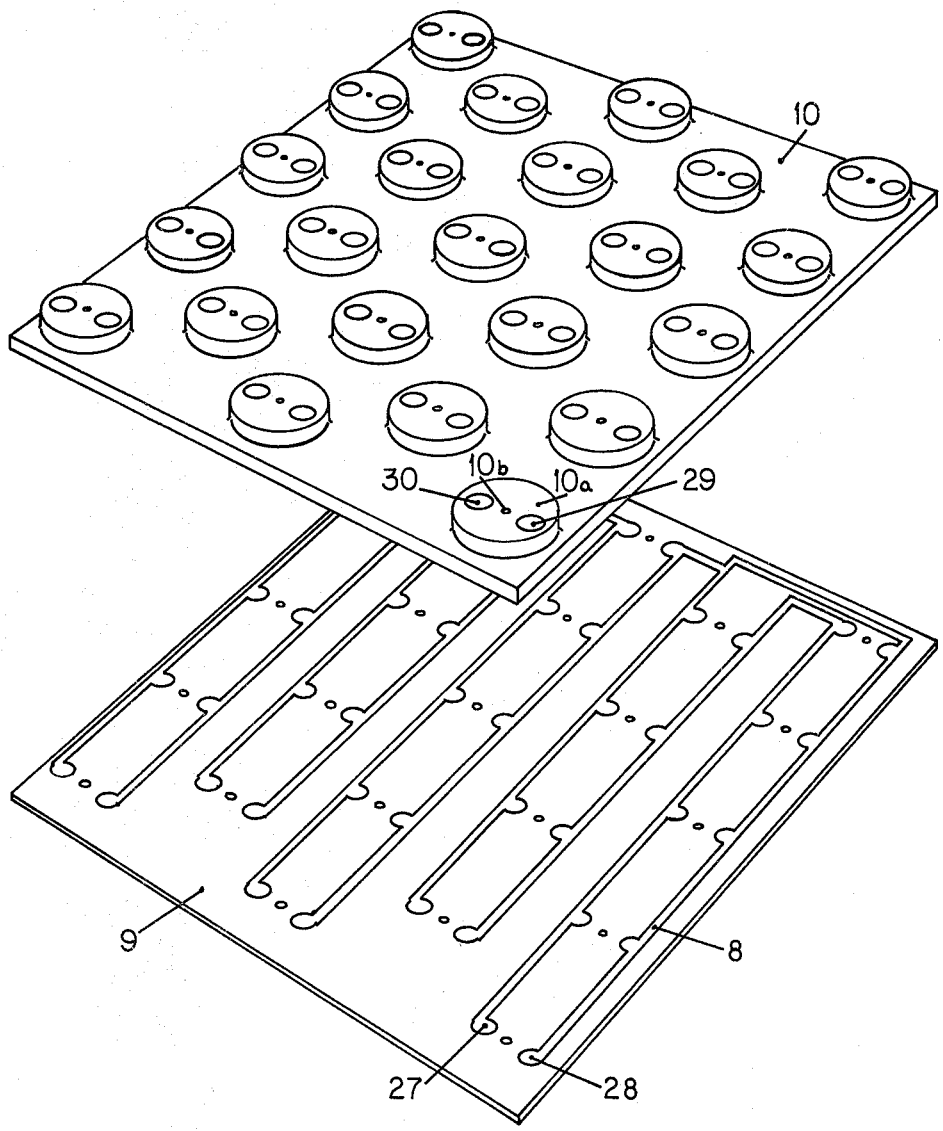
Figure 5:
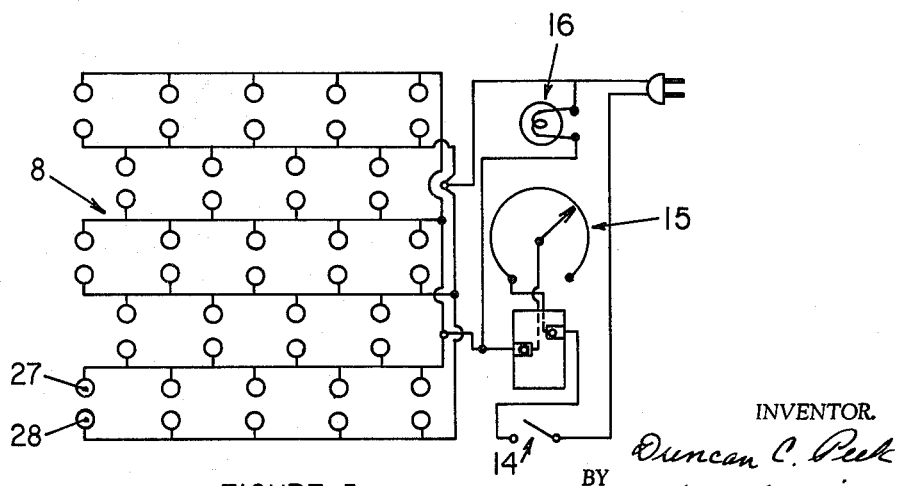
FIG. 5 is a wiring diagram of the portable electric range illustrated in FIG. 1.

FIG. 5 represents the schematic wiring diagram of the portable electric range of FIG. 1 and corresponds to the description established with the explanation of FIGS. 1 and 3.

Figure 6:
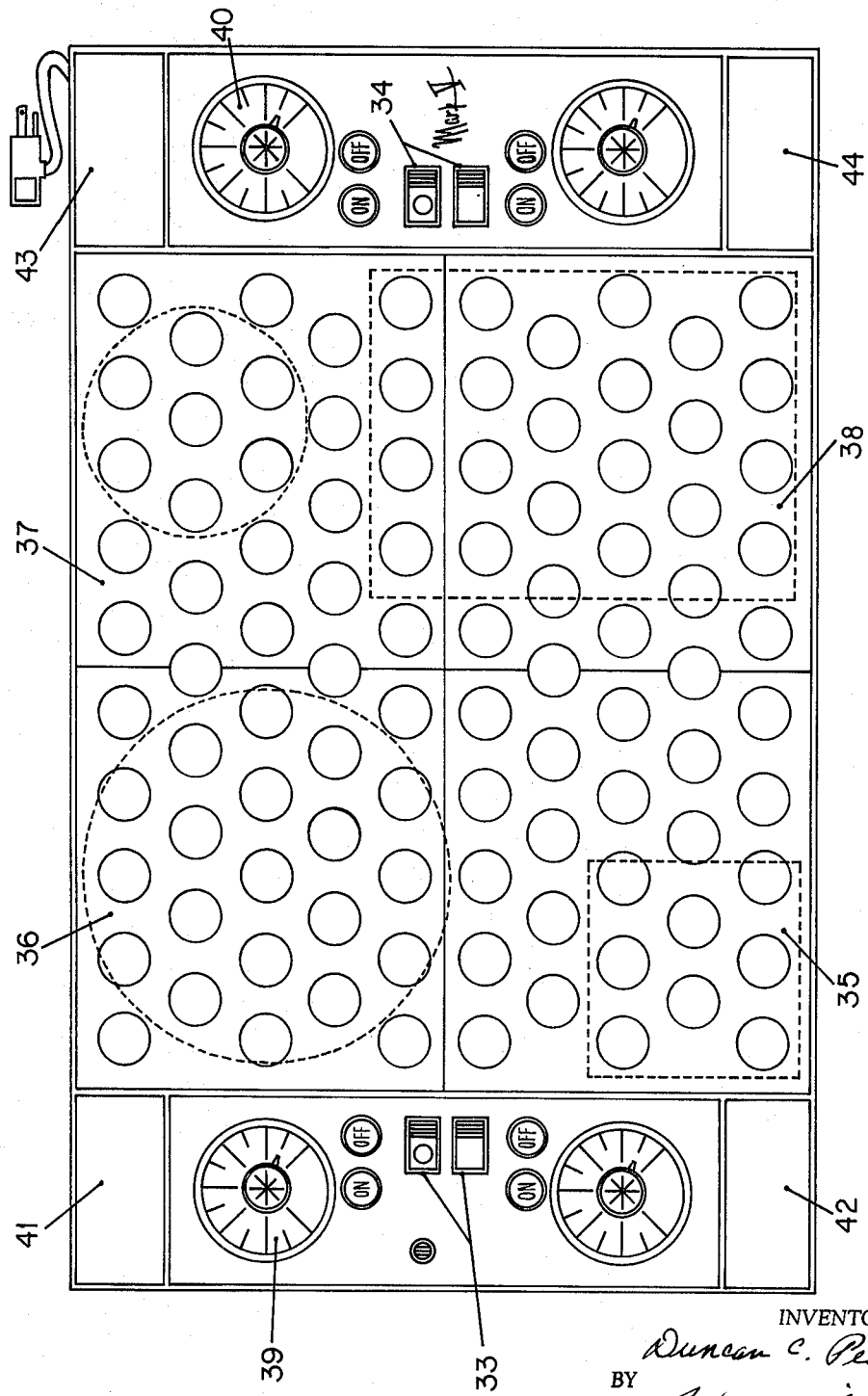

The table-top or built-in range as illustrated in FIG. 6 is made by combining the circuit board assemblies of four portable stoves and by rearranging the control panels of four portable stoves. As shown, a tie-in switch 33 and 34 respectively has been added to each bank control panel to permit the use of two sections controlled by one variable transformer so that a large utensil can overlap these two sections and still be completely covered by heating elements to provide maximum efficiency and economy. In this case switch 33 ties-in sections 35 and 36 to be controlled by the variable transformer 39 and switch 34 ties-in sections 37 and 38 to be controlled by the variable transformer 40. The lights 41, 42 and 43, 44 are controlled in their respective sequences along with the variable transformers 39 and 40. Again it must be understood that the control lights 41, 42, 43 and 44 are used to signify that each corresponding section has been activated and also to show the relative intensity of the temperature that each element will develop after being depressed and activated. This visual communication will aid the user of this range to determine correct heating temperatures and to avoid wasting current.

The dotted lines in FIG. 6 represent the different configurations of utensils that can be heated by this range. The outlined shapes are scaled from conventional sizes and as can be seen, the wasted heat would be minimal as compared to the total heating element coverage of the utensils surface area.

Figure 7:
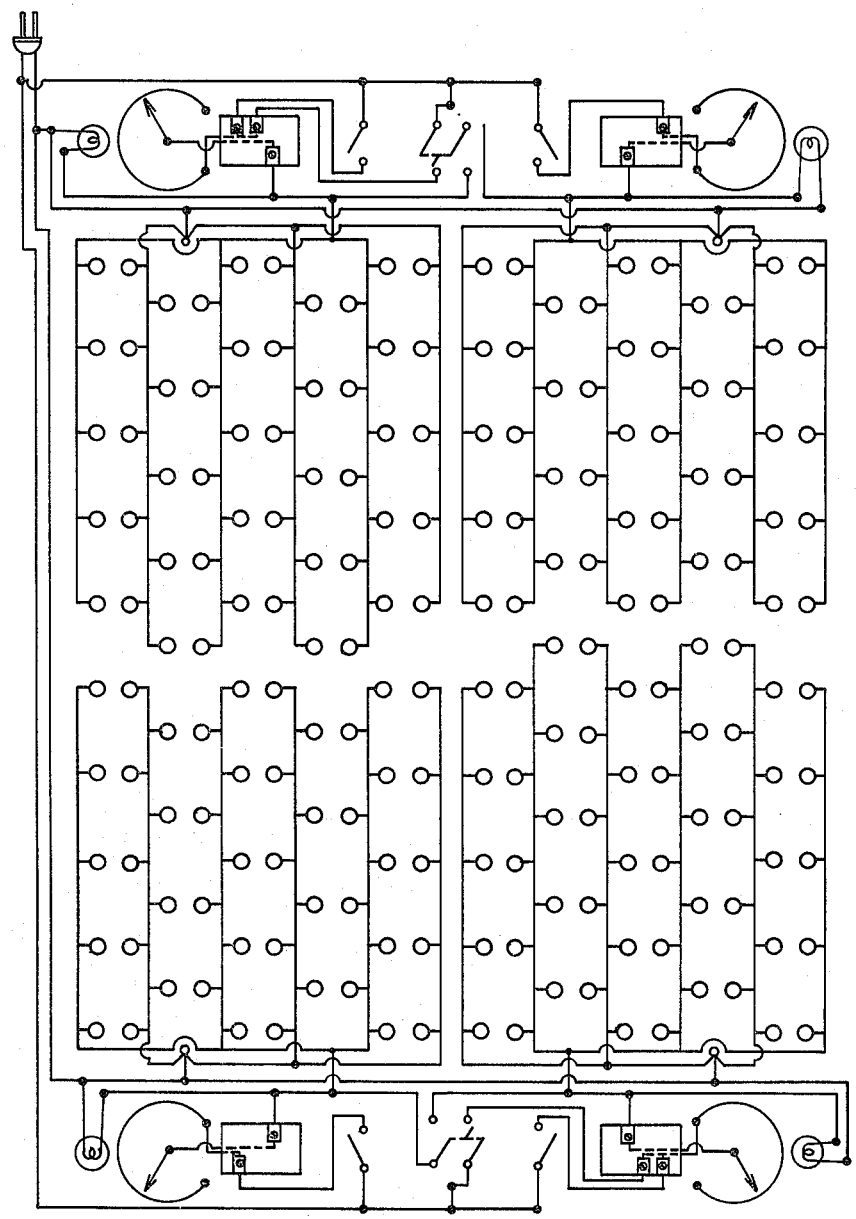
FIG. 7 is a wiring diagram of the table top range illustrated in FIG. 6.

The schematic wiring diagram shown in FIG. 7 is self-explanatory but, as expressed before, it would be of four printed circuit boards similar to that used in the portable electric range of FIG. 1.

There are many variations of this invention which would be apparent to those skilled in the techniques of design and production and which would not depart from the essence and scope of this invention as described and claimed herein.

I claim:

1. An electric heating device for heating utensils by conductive transmission of heat, said device comprising a plurality of electric heating elements, each being independently movable from a de-energized position to an energized position, and elastic means biasing each of said heating elements from the energized position into the de-energized position, each heating element comprising a shell substantially in the form of an inverted cup, a resistance element spaced apart from the inside surface of the shell and embedded in a body of dielectric refractory material secured in the cup, a pair of contact terminals connected to the ends of the resistance element therein and protruding from the insulation body, and mounting means slidably supporting the shell for up and down displacement.

2. An electric heating device for heating utensils by conductive transmission of heat, said device comprising a plurality of individual heating elements, each of said elements having a support surface for supporting thereon a utensil to be heated in heat-transmitting relationship and being mounted depressible by the weight of a utensil placed thereupon from an upper de-energized position into a lower energized position, and an elastic means for each of said heating elements to bias the respective heating element from its lower energized position into its upper de-energized position, each heating element comprising a shell substantially in the form of an inverted cup, a resistance element spaced apart from the inside surface of the shell and embedded in a body of dielectric refractory material secured in the cup, a pair of contact terminals connected to the ends of the resistance element therein and protruding from the insulation body, and mounting means slidably supporting the shell for up and down displacement.

3. An electric heating device according to claim 2 wherein the support surfaces of said heating elements are disposed in a common horizontal plane in the depressed position of the heating elements.

4. An electric heating device for heating utensils by conductive transmission of heat, said device comprising a plurality of electric heating elements, each being independently movable from a de-energized position to an energized position, elastic means biasing each of said heating elements from the energized position into the de-energized position, and energizing circuit means connectable to said heating elements, said circuit means including adjustable current control means for regulating the current supplied to the heating elements and thus the temperature thereof, each heating element comprising a shell substantially in the form of an inverted cup, a resistance element spaced apart from the inside surface of the shell and embedded in a body of dielectric refractory material secured in the cup, a pair of contact terminals connected to the ends of the resistance element therein and protruding from the insulation body, and mounting means slidably supporting the shell for up and down displacement.

5. An electric heating device for heating utensils by conductive transmission of heat, said device comprising a plurality of individual heating elements, each of said elements having a support surface for supporting thereon a utensil to be heated in heat-transmitting relationship and being mounted depressible by the weight of a utensil placed thereupon from an upper de-energized position into a lower energized position, elastic means for each of said heating elements to bias the respective heating element from its lower energized position into its upper de-energized position, and energizing circuit means connectable to said heating elements, said circuit means including adjustable current control means for regulating the current supplied to the heating elements and thus the temperature thereof, each heating element comprising a shell substantially in the form of an inverted cup, a resistance element spaced apart from the inside surface of the shell and embedded in a body of dielectric refractory material secured in the cup, a pair of contact terminals connected to the ends of the resistance element therein and protruding from the insulation body, and mounting means slidably supporting the shell for up and down displacement.

6. A heating device according to claim 5 wherein said energizing circuit means further include visual indicating means for indicating the state of energization of said heating elements.

7. An electric heating device for heating utensils by conductive transmission of heat, said device comprising several groups of electric heating elements, each of these groups including a plurality of heating elements, each heating element in each group being independently movable from a de-energized position to an energized position, and elastic means for each group of heating elements biasing the heating elements of the respective group from the energized position into the de-energized position, each heating element comprising a shell substantially in the form of an inverted cup, a resistance element spaced apart from the inside surface of the shell and embedded in a body of dielectric refractory material secured in the cup, a pair of contact terminals connected to the ends of the resistance element therein and protruding from the insulation body, and mounting means slidably supporting the shell for up and down displacement.

8. An electric heating device for heating utensils by conductive transmission of heat, said device comprising several groups of electric heating elements, each of these groups including a plurality of heating elements, each heating element in each group being independently movable from a de-energized position to an energized position, elastic means for each group of heating elements biasing the heating elements of the respective group from the energized position into the de-energized position, energizing circuit means connectable to the heating elements of each group, and an adjustable current control means for each of said groups included in said circuit means to regulate the current supplied to the heating elements in each group independently of the current supplied to the heating elements in other groups, each heating element comprising a shell substantially in the form of an inverted cup, a resistance element spaced apart from the inside surface of the shell and embedded in a body of dielectric refractory material secured in the cup, a pair of contact terminals connected to the ends of the resistance element therein and protruding from the insulation body, and mounting means slidably supporting the shell for up and down displacement.

9. A heating device according to claim 8 and also comprising visual indicating means connected in circuit with each of said control means for indicating the state of energization of the heating elements in the respective group.

10. A heating device according to claim 5 wherein each of said heating elements comprises a shell substantially in the form of an inverted cup, a resistance element spaced apart from the inner surface of the shell and embedded in a body of hardened insulation material secured in said cup, a pair of contact terminals connected to the ends of the resistance element therein and protruding from said insulation body, and mounting means slidably supporting said shell for up and down displacement, said energizing circuit means including a plurality of pairs of contact terminals connected in parallel, each of said pairs of circuit terminals being connected with the contact terminals of a respective heating element in its lower position, and each of said elastic means urging the shell of the respective heating element into its upper position.

11. A heating device according to claim 10 and comprising a horizontally mounted cover plate including a plurality of openings, each of said shells being slidably fitted into one of said openings and protruding on the top side of said plate.

12. A heating device according to claim 11 wherein said energizing circuit means comprises a circuit board including insulation-backed conductor strips, said parallel pairs of contact terminals of the energizing circuit means being formed on said strips to interconnect the same by engagement with the contact terminals of the respective heating element.

References Cited by the Examiner
UNITED STATES PATENTS

| | | | |
|---|---|---|---|
| 2,155,425 | 4/39 | La Mere | 219—446 |
| 2,272,658 | 2/42 | Challet | 219—466 |
| 2,689,903 | 9/54 | Radley | 219—446 |
| 2,909,636 | 10/59 | Chambers | 219—417 |

RICHARD M. WOOD, *Primary Examiner.*